US010911360B2

(12) United States Patent
Boutros et al.

(10) Patent No.: US 10,911,360 B2
(45) Date of Patent: *Feb. 2, 2021

(54) ANYCAST EDGE SERVICE GATEWAYS

(71) Applicant: Nicira, Inc., Palo Alto, CA (US)

(72) Inventors: Sami Boutros, Union City, CA (US); Anirban Sengupta, Saratoga, CA (US); Sreeram Ravinoothala, San Jose, CA (US); Liwen Wu, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,939

(22) Filed: Jun. 20, 2019

(65) Prior Publication Data

US 2019/0312812 A1 Oct. 10, 2019

Related U.S. Application Data

(63) Continuation of application No. 15/445,922, filed on Feb. 28, 2017, now Pat. No. 10,341,236.
(Continued)

(51) Int. Cl.
*H04J 1/16* (2006.01)
*H04L 1/00* (2006.01)
(Continued)

(52) U.S. Cl.
CPC ........ *H04L 47/125* (2013.01); *H04L 12/4633* (2013.01); *H04L 12/66* (2013.01);
(Continued)

(58) Field of Classification Search
CPC ... H04L 47/125; H04L 12/4633; H04L 12/66; H04L 45/586; H04L 45/64; H04L 45/74; H04L 41/0806
See application file for complete search history.

(56) References Cited

U.S. PATENT DOCUMENTS 5,504,921 A 4/1996 Dev et al.
5,550,816 A 8/1996 Hardwick et al.
(Continued)

FOREIGN PATENT DOCUMENTS

CN 1442987 A 9/2003
CN 1714548 A 12/2005
(Continued)

OTHER PUBLICATIONS

Cisco ("VXLAN Deployment Models—A practical perspective", Victor Moreno, 2015, latter half of this document). (Year: 2015).*
(Continued)

*Primary Examiner* — Maharishi V Khirodhar
(74) *Attorney, Agent, or Firm* — Adeli LLP (57) ABSTRACT

Some embodiments provide a method for managing traffic in a virtualized environment. The method, in some embodiments, configures multiple edge service gateways (ESGs) executing on multiple host machines (e.g., on a hypervisor) to use a same anycast inner internet protocol (IP) address and a same anycast inner media access control (MAC) address. In some embodiments, ESGs of a logical network facilitate communication between machines connected to the logical network and machines on external networks. In some embodiments, the method configures a set of virtual extensible local area network tunnel endpoints (VTEPs) connected to an ESG to use a same anycast VTEP IP address. The method, in some embodiments, configures a distributed logical router (DLR or DR) to send data packets with destinations outside the logical network from sources belonging to the logical network to the anycast VTEP IP address.

20 Claims, 7 Drawing Sheets

Related U.S. Application Data (60) Provisional application No. 62/402,874, filed on Sep. 30, 2016.

(51) Int. Cl.
*H04L 12/803* (2013.01)
*H04L 12/715* (2013.01)
*H04L 12/66* (2006.01)
*H04L 12/931* (2013.01)
*H04L 12/46* (2006.01)
*H04L 12/713* (2013.01)
*H04L 12/24* (2006.01)
*H04L 12/741* (2013.01)

(52) U.S. Cl.
CPC ........ *H04L 41/0806* (2013.01); *H04L 45/586* (2013.01); *H04L 45/64* (2013.01); *H04L 45/74* (2013.01); *H04L 49/70* (2013.01)

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,914,907 B1 | 7/2005 | Bhardwaj et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,107,356 B2 | 9/2006 | Baxter et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,447,197 B2 | 11/2008 | Terrell et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,630,358 B1 | 12/2009 | Lakhani et al. |
| 7,643,488 B2 | 1/2010 | Khanna et al. |
| 7,649,851 B2 | 1/2010 | Takashige et al. |
| 7,653,747 B2 | 1/2010 | Lucco et al. |
| 7,710,874 B2 | 5/2010 | Balakrishnan et al. |
| 7,742,459 B2 | 6/2010 | Kwan et al. |
| 7,764,599 B2 | 7/2010 | Doi et al. |
| 7,778,268 B2 | 8/2010 | Khan et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,987,506 B1 | 7/2011 | Khalid et al. |
| 7,991,859 B1 | 8/2011 | Miller et al. |
| 7,995,483 B1 | 8/2011 | Bayar et al. |
| 8,027,260 B2 | 9/2011 | Venugopal et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,416,709 B1 | 4/2013 | Marshall et al. |
| 8,456,984 B2 | 6/2013 | Ranganathan et al. |
| 8,504,718 B2 | 8/2013 | Wang et al. |
| 8,559,324 B1 | 10/2013 | Brandwine et al. |
| 8,565,108 B1 | 10/2013 | Marshall et al. |
| 8,600,908 B2 | 12/2013 | Lin et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,724,456 B1 | 5/2014 | Hong et al. |
| 8,745,177 B1 | 6/2014 | Kazerani et al. |
| 8,958,298 B2 | 2/2015 | Zhang et al. |
| 9,021,066 B1 | 4/2015 | Singh et al. |
| 9,059,999 B2 | 6/2015 | Koponen et al. |
| 9,137,052 B2 | 9/2015 | Koponen et al. |
| 9,313,129 B2 | 4/2016 | Ganichev et al. |
| 9,419,855 B2 | 8/2016 | Ganichev et al. |
| 9,485,149 B1 | 11/2016 | Traina et al. |
| 9,503,321 B2 | 11/2016 | Neginhal et al. |
| 9,559,980 B2 | 1/2017 | Li et al. |
| 9,647,883 B2 | 5/2017 | Neginhal et al. |
| 9,749,214 B2 | 8/2017 | Han |
| 9,787,605 B2 | 10/2017 | Zhang et al. |
| 10,057,157 B2 | 8/2018 | Goliya et al. |
| 10,075,363 B2 | 9/2018 | Goliya et al. |
| 10,079,779 B2 | 9/2018 | Zhang et al. |
| 10,095,535 B2 | 10/2018 | Dubey et al. |
| 10,110,431 B2 | 10/2018 | Ganichev et al. |
| 10,129,142 B2 | 11/2018 | Goliya et al. |
| 10,129,180 B2 | 11/2018 | Zhang et al. |
| 10,153,973 B2 | 12/2018 | Dubey |
| 10,230,629 B2 | 3/2019 | Masurekar et al. |
| 10,270,687 B2 | 4/2019 | Mithyantha |
| 10,341,236 B2 * | 7/2019 | Boutros ............... A01F 12/442 |
| 10,411,955 B2 | 9/2019 | Neginhal et al. |
| 10,454,758 B2 | 10/2019 | Boutros et al. |
| 2001/0043614 A1 | 11/2001 | Viswanadham et al. |
| 2002/0067725 A1 | 6/2002 | Oguchi et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0067924 A1 | 4/2003 | Choe et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |

(56) References Cited

U.S. PATENT DOCUMENTS

| | | |
|---|---|---|
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0059253 A1 | 3/2006 | Goodman et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291387 A1 | 12/2006 | Kimura et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0206591 A1 | 9/2007 | Doviak et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0253396 A1 | 10/2008 | Olderdissen |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0064305 A1 | 3/2009 | Stiekes et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0149964 A1 | 6/2011 | Judge et al. |
| 2011/0149965 A1 | 6/2011 | Judge et al. |
| 2011/0194567 A1 | 8/2011 | Shen |
| 2011/0205931 A1 | 8/2011 | Zhou et al. |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0131643 A1 | 5/2012 | Cheriton |
| 2012/0155467 A1 | 6/2012 | Appenzeller |
| 2012/0182992 A1 | 7/2012 | Cowart et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0058225 A1 | 3/2013 | Casado et al. |
| 2013/0058229 A1 | 3/2013 | Casado et al. |
| 2013/0058335 A1 | 3/2013 | Koponen et al. |
| 2013/0058350 A1 | 3/2013 | Fulton |
| 2013/0058353 A1 | 3/2013 | Koponen et al. |
| 2013/0060940 A1 | 3/2013 | Koponen et al. |
| 2013/0094350 A1 | 4/2013 | Mandal et al. |
| 2013/0103817 A1 | 4/2013 | Koponen et al. |
| 2013/0103818 A1 | 4/2013 | Koponen et al. |
| 2013/0132536 A1 | 5/2013 | Zhang et al. |
| 2013/0142048 A1 | 6/2013 | Gross, IV et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0212148 A1 | 8/2013 | Koponen et al. |
| 2013/0223444 A1 | 8/2013 | Liljenstolpe et al. |
| 2013/0230047 A1 | 9/2013 | Subrahmaniam et al. |
| 2013/0266007 A1 | 10/2013 | Kumbhare et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0059226 A1 | 2/2014 | Messerli et al. |
| 2014/0146817 A1 | 5/2014 | Zhang |
| 2014/0173093 A1 | 6/2014 | Rabeela et al. |
| 2014/0195666 A1 | 7/2014 | Dumitriu et al. |
| 2014/0229945 A1 | 8/2014 | Barkai et al. |
| 2014/0241247 A1 | 8/2014 | Kempf et al. |
| 2014/0269299 A1 | 9/2014 | Koornstra |
| 2014/0328350 A1 | 11/2014 | Hao et al. |
| 2014/0372582 A1 | 12/2014 | Ghanwani et al. |
| 2014/0376550 A1 | 12/2014 | Khan et al. |
| 2015/0016300 A1 | 1/2015 | Devireddy et al. |
| 2015/0063360 A1 | 3/2015 | Thakkar et al. |
| 2015/0089082 A1 | 3/2015 | Patwardhan et al. |
| 2015/0103838 A1 | 4/2015 | Zhang et al. |
| 2015/0188770 A1 | 7/2015 | Naiksatam et al. |
| 2015/0222550 A1 | 8/2015 | Anand |
| 2015/0263897 A1 | 9/2015 | Ganichev et al. |
| 2015/0263946 A1 | 9/2015 | Tubaltsev et al. |
| 2015/0263952 A1 | 9/2015 | Ganichev et al. |
| 2015/0271011 A1 | 9/2015 | Neginhal et al. |

(56) References Cited

U.S. PATENT DOCUMENTS

| | | |
|---|---|---|
| 2015/0271303 A1 | 9/2015 | Neginhal et al. |
| 2016/0105471 A1 | 4/2016 | Nunes et al. |
| 2016/0119229 A1 | 4/2016 | Zhou |
| 2016/0182287 A1 | 6/2016 | Chiba et al. |
| 2016/0191374 A1 | 6/2016 | Singh et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0261493 A1 | 9/2016 | Li |
| 2016/0294612 A1 | 10/2016 | Ravinoothala et al. |
| 2016/0344586 A1 | 11/2016 | Ganichev et al. |
| 2017/0005923 A1 | 1/2017 | Babakian |
| 2017/0048129 A1 | 2/2017 | Masurekar et al. |
| 2017/0048130 A1 | 2/2017 | Goliya et al. |
| 2017/0063632 A1 | 3/2017 | Goliya et al. |
| 2017/0063633 A1 | 3/2017 | Goliya et al. |
| 2017/0064717 A1 | 3/2017 | Filsfils et al. |
| 2017/0070425 A1 | 3/2017 | Mithyantha |
| 2017/0126497 A1 | 5/2017 | Dubey et al. |
| 2017/0230241 A1 | 8/2017 | Neginhal et al. |
| 2017/0317919 A1 | 11/2017 | Fernando et al. |
| 2018/0006943 A1 | 1/2018 | Dubey |
| 2018/0062914 A1 | 3/2018 | Boutros et al. |
| 2018/0097734 A1 | 4/2018 | Boutros et al. |
| 2018/0367442 A1 | 12/2018 | Goliya et al. |
| 2019/0018701 A1 | 1/2019 | Dubey et al. |
| 2019/0020600 A1 | 1/2019 | Zhang et al. |
| 2019/0109780 A1 | 4/2019 | Nagarkar |
| 2019/0124004 A1 | 4/2019 | Dubey |
| 2019/0190885 A1 | 6/2019 | Krug et al. |
| 2019/0199625 A1 | 6/2019 | Masurekar et al. |
| 2019/0245783 A1 | 8/2019 | Mithyantha |
| 2019/0334767 A1 | 10/2019 | Neginhal et al. |

FOREIGN PATENT DOCUMENTS

| | | |
|---|---|---|
| CN | 103890751 A | 6/2014 |
| CN | 104335553 A | 2/2015 |
| EP | 1653688 A1 | 5/2006 |
| EP | 3013006 A1 | 4/2016 |
| JP | 2003069609 A | 3/2003 |
| JP | 2003124976 A | 4/2003 |
| JP | 2003318949 A | 11/2003 |
| KR | 1020110099579 A | 9/2011 |
| WO | 2005112390 A1 | 11/2005 |
| WO | 2008095010 A1 | 8/2008 |
| WO | 2013020126 A1 | 2/2013 |
| WO | 2013026049 A1 | 2/2013 |
| WO | 2013055697 A1 | 4/2013 |
| WO | 2013143611 A1 | 10/2013 |
| WO | 2013184846 A1 | 12/2013 |
| WO | 2015015787 A1 | 2/2015 |
| WO | 2015142404 A1 | 9/2015 |
| WO | 2016123550 A1 | 8/2016 |
| WO | 2017027073 A1 | 2/2017 |
| WO | 2018044746 A1 | 3/2018 |

OTHER PUBLICATIONS

Cisco (Cisco border gateway protocol control plane for virtual Extensible LAN, 2015). (Year: 2015).*
Cisco ("Cisco data Center Spine and Leaf Architecture: Design overview", 2016). (Year: 2016).*
Cisco Border Gateway Protocol Control Plane for Virtual Extensible LAN (Year: 2015).*
Cisco Data Center Spine-and-Leaf Architecture: Design Overview (Year: 2016).*
VXLAN Deployment Models—A Practical Perspective (Year: 2015).*
Agarwal, Sugam, et al., "Traffic Engineering in Software Defined Networks," 2013 Proceedings IEEE INFOCOM, Apr. 14, 2013, 10 pages, Bell Labs, Alcatel-Lucent, Holmdel, NJ, USA.
Aggarwal, R. et al., "Data Center Mobility based on E-VPN, BGP/MPLS IP VPN, IP Routing and NHRP," draft-raggarwa-data-center-mobility-05.txt, Jun. 10, 2013, 24 pages, Internet Engineering Task Force, IETF, Geneva, Switzerland.
Author Unknown, "VMware® NSX Nework Virtualization Design Guide," Month Unknown 2013, 32 pages, Item No. VMW-NSX-NTWK-VIRT-DESN-GUIDE-V2-101, VMware, Inc., Palo Alto, CA, USA.
Ballani, Hitesh, et al., "Making Routers Last Longer with ViAggre," NSDI '09: 6th Usenix Symposium on Networked Systems Design and Implementation, Apr. 2009, 14 pages, Usenix Association.
Caesar, Matthew, et al., "Design and Implementation of a Routing Control Platform," NSDI '05: 2nd Symposium on Networked Systems Design & Implementation, Apr. 2005, 14 pages, Usenix Association.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, 17 pages, ACM, New York, NY.
Dumitriu, Dan Mihai, et al., (U.S. Appl. No. 61/514,990), filed Aug. 4, 2011.
Fernando, Rex, et al., "Service Chaining using Virtual Networks with BGP," Internet Engineering Task Force, IETF, Jul. 7, 2015, 32 pages, Internet Society (ISOC), Geneva, Switzerland, available at https://tools.ietf.org/html/draft-fm-bess-service-chaining-01.
Handley, Mark, et al., "Designing Extensible IP Router Software," Proc. of NSDI, May 2005, 14 pages.
Kim, Changhoon, et al., "Revisiting Route Caching: The World Should be Flat," in Proc. of International Conference on Passive and Active Network Measurement, Apr. 2009, 10 pages, Springer, Berlin, Heidelberg.
Koponen, Teemu, et al., "Network Virtualization in Multi-tenant Datacenters," Technical Report TR-2013-001E, Aug. 2013, 22 pages, VMware, Inc., Palo Alto, CA, USA.
Lakshminarayanan, Karthik, et al., "Routing as a Service," Report No. UCB/CSD-04-1327, Month Unknown 2004, 16 pages, Computer Science Division (EECS), University of California—Berkeley, Berkeley, California.
Lowe, Scott, "Learning NSX, Part 14: Using Logical Routing," Scott's Weblog: The weblog of an IT pro specializing in cloud computing, virtualization, and networking, all with an open source view, Jun. 20, 2014, 8 pages, available at https://blog.scottlowe.org/2014/06/20/learning-nsx-part-14-using-logical-routing/.
Maltz, David A., et al., "Routing Design in Operational Networks: A Look from the Inside," SIGCOMM '04, Aug. 30-Sep. 3, 2004, 14 pages, ACM, Portland, Oregon, USA.
Non-Published commonly owned U.S. Appl. No. 16/210,410, filed Dec. 5, 2018, 29 pages, VMware, Inc.
Non-published commonly owned U.S. Appl. No. 6/218,433, filed Dec. 12, 2018, 27 pages, VMware, Inc.
Non-published commonly owned U.S. Appl. No. 16/275,355, filed Feb. 14, 2019, 28 pages, VMware, Inc.
Non-Published commonly Owned U.S. Appl. No. 16/290,864, filed Mar. 2, 2019, 76 pages, Nicira, Inc.
Pelissier, Joe, "Network Interface Virtualization Review," Jan. 2009, 38 pages.
Rosen, E., "Applicability Statement for BGP/MPLS IP Virtual Private Networks (VPNs)," RFC 4365, Feb. 2006, 32 pages, The Internet Society.
Shenker, Scott, et al., "The Future of Networking, and the Past of Protocols," Dec. 2, 2011, 30 pages, USA.
Wang, Anjing, et al., "Network Virtualization: Technologies, Perspectives, and Frontiers," Journal of Lightwave Technology, Feb. 15, 2013, 15 pages, IEEE.
Wang, Yi, et al., "Virtual Routers on the Move: Live Router Migration as a Network-Management Primitive," SIGCOMM '08, Aug. 17-22, 2008, 12 pages, ACM, Seattle, Washington, USA.
Non-published commonly owned U.S. Appl. No. 16/581,118, filed Sep. 24, 2019, 36 pages, Nicira, Inc.

* cited by examiner

ANYCAST EDGE SERVICE GATEWAYS

CLAIM OF BENEFIT TO PRIOR APPLICATIONS

This present Application is a continuation application of U.S. patent application Ser. No. 15/445,922, filed Feb. 28, 2017, now published as U.S. Patent Publication 2018/0097734. U.S. patent application Ser. No. 15/445,922, claims the benefit of U.S. Provisional Patent Application 62/402,874, filed Sep. 30, 2016. U.S. patent application Ser. No. 15/445,922, now published as U.S. Patent Publication 2018/0097734 is incorporated herein by reference.

BACKGROUND

Data centers provide access to external networks at edge service gateways. In data centers providing software defined networks to tenants, a logical network may be organized in a manner that is significantly different from an underlying physical network. As such, edge service gateways placed on a same logical switch may be located in disparate locations of the physical network. Therefore, methods for addressing a closest edge service gateway from source machines connected to a logical network is needed.

BRIEF SUMMARY

Some embodiments provide a method for managing traffic in a virtualized environment. In some embodiments, the method is performed by a management plane that centrally manages the network (e.g., implemented in a network controller). The method, in some embodiments, configures multiple edge service gateways (ESGs) executing on multiple host machines (e.g., on a hypervisor) to use a same anycast inner internet protocol (IP) address and a same anycast inner media access control (MAC) address. In some embodiments, ESGs of a logical network facilitate communication between machines connected to the logical network and machines on external networks. In some embodiments, the method configures a set of virtual extensible local area network tunnel endpoints (VTEPs) connected to an ESG to use a same anycast VTEP IP address. The method, in some embodiments, configures a distributed logical router (DLR or DR) to send data packets with destinations outside the logical network from sources belonging to the logical network to the anycast VTEP IP address.

Configuring a DR, in some embodiments, includes configuring the DR to use the anycast inner IP address of the ESGs as a default gateway. In some embodiments, the anycast inner IP address maps to the inner MAC address of the ESGs, which in turn maps to the anycast VTEP IP address. Such configuration, in some embodiments, results in data packets being sent to an edge gateway that is closest according to a routing control protocol (e.g., a border gateway protocol (BGP); or an interior gateway protocol (IGP), such as open shortest path first (OSPF), routing information protocol (RIP), intermediate system to intermediate system (IS-IS), etc.). When multiple ESGs are closest according to the routing control protocol, in some embodiments, a load-balancing operation (e.g., equal-cost multi-path routing) is used to distribute data packets among the multiple closest ESGs.

In some embodiments, the availability of the anycast VTEP IP address at a particular host is advertised to a switch (or other forwarding element) connecting the host to an underlay network (e.g., a data center fabric). The switch, in some embodiments, then advertises the availability of the anycast VTEP IP address via the switch to other forwarding elements in the underlay network (e.g., top of rack (TOR) switches, routers, etc.).

In some embodiments, the method adds (e.g., provisions), removes, or migrates ESGs without having to reconfigure the default route or default gateway of a DR. In some embodiments, the method adds or removes ESGs based on a traffic load placed on each ESG or on the set of ESGs as a whole. In general, using an anycast address for all ESGs allows a larger number of ESGs to be provisioned for a particular logical switch and distributed router without having to reprogram a distributed router to handle more default gateways. In addition, using an anycast allows data message traffic to be routed more efficiently over a network by using a closest ESG for north-south traffic without creating unnecessary east-west traffic to reach a more distant ESG.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a method for managing traffic in a virtualized environment. In some embodiments, the method is performed by a management plane that centrally manages the network (e.g., implemented in a network controller). The method, in some embodiments, configures multiple edge service gateways (ESGs) executing on multiple host machines (e.g., on a hypervisor) to use a same anycast inner internet protocol (IP) address and a same anycast inner media access control (MAC) address. The anycast inner IP addresses and anycast inner MAC addresses in some embodiments are addresses in an overlay network. In some embodiments, ESGs of a logical network facilitate communication between machines connected to the logical network and machines on external networks. In some embodiments, the method configures a set of virtual extensible local area network tunnel endpoints (VTEPs) connected to an ESG to use a same anycast VTEP IP address. The method, in some embodiments, configures a distributed logical router (DLR or DR) to send data packets with destinations outside the logical network from sources belonging to the logical network to the anycast VTEP IP address.

Anycast addressing allows a same address to be used for multiple destinations (in some embodiments of this invention the multiple destinations are redundant destinations). A packet sent to an anycast address is forwarded to a nearest node (also referred to as a closest node or along a shortest path) according to an internal gateway protocol (IGP) (e.g., open shortest path first (OSPF), routing information protocol (RIP), intermediate system to intermediate system (IS-IS), etc.). Such a nearest node along a route, in some embodiments, is calculated based on administrative distance values, used to determine priority, with larger values indicating lower priority types of route.

As used in this document, the term data packet or packet refers to a collection of bits in a particular format sent across a network. It should be understood that the term data packet or packet may be used herein to refer to various formatted collections of bits that may be sent across a network, such as Ethernet frames, IP packets, TCP segments, UDP datagrams, etc. While the examples below refer to data packets or packets, it should be understood that the invention should not be limited to any specific format or type of data packet. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 1:
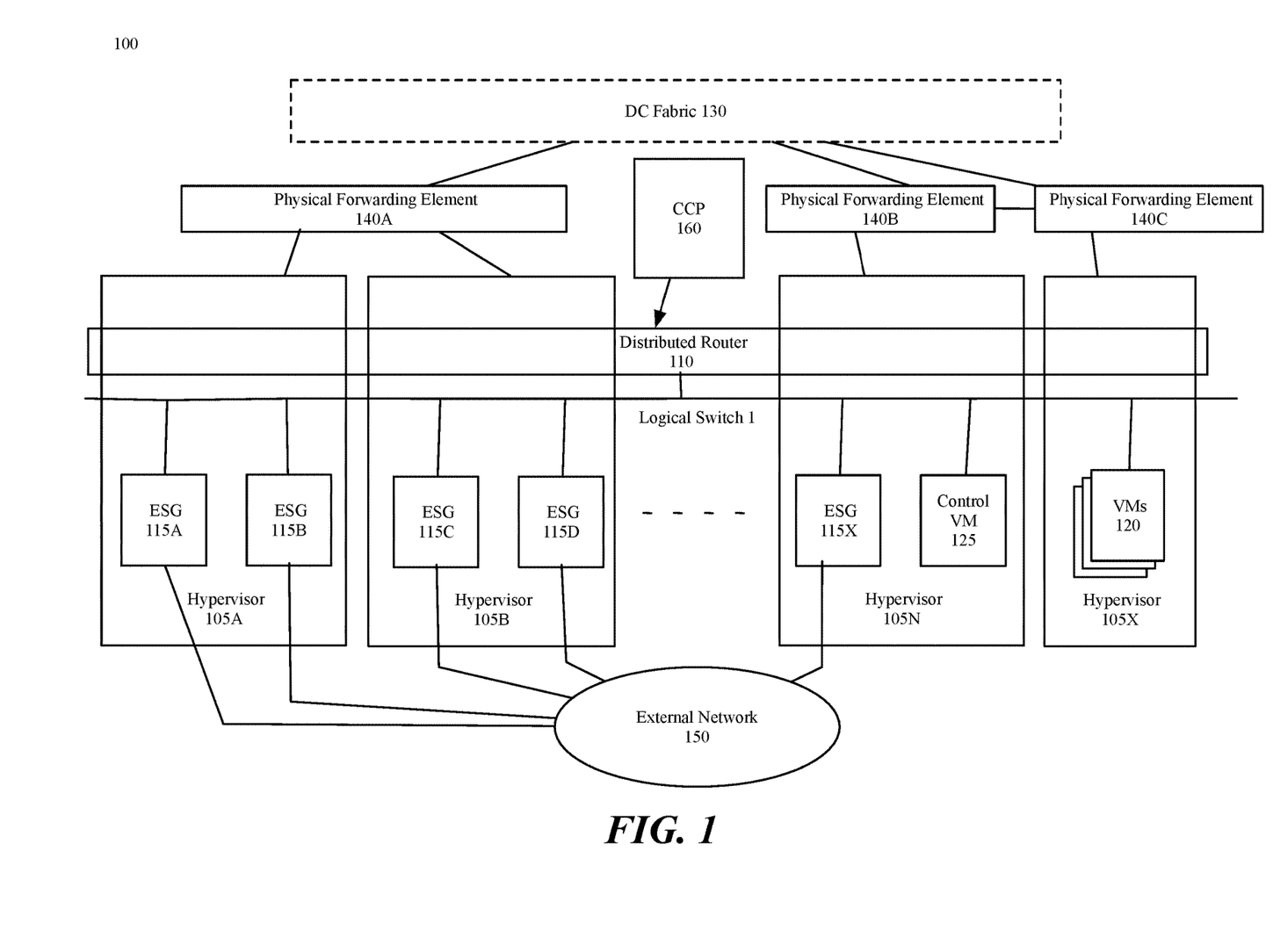
FIG. 1 illustrates a network that includes edge service gateways, physical forwarding elements, and virtual machines in which the invention operates.

FIG. 1 conceptually illustrates a network system 100 in which some embodiments of the invention are implemented. FIG. 1 includes a number of hypervisors 105A-N and 105X, a distributed router 110, edge service gateways (ESGs) 115A-X, a control VM 125, VMs 120, a data center fabric 130, physical forwarding elements 140A-C, an external network 150, and a central control plane (CCP) 160. For simplicity, FIG. 1 only shows a subset of the elements running on hypervisors 105A-N and 105X and edge service gateways 115A-X. One of ordinary skill in the art would understand that hypervisors and edge nodes are merely two possible elements that can be run on a host machine and that the host machine (not shown), hypervisor, and edge service gateway may contain similar, additional, or alternative elements.

Hypervisors 105A-N and X are illustrated conceptually as including VMs (ESGs 115A-X, and VMs 120) and as being spanned by distributed router 110 connected to logical switch 1. Hypervisors execute on a host machine (not shown) (e.g., directly on a host machine (bare metal), or on top of an operating system executing on the host machine). Hypervisors 115A-X in the embodiment depicted in FIG. 1 also include VTEP endpoints (not shown) that connect to the logical switch and facilitate the implementation of the logical switch.

Distributed router 110, represents a logical router that is implemented by managed forwarding elements on the host machines or hypervisors. As shown, distributed router 110 is connected to logical switch 1, but in some embodiments connects to multiple logical switches belonging to a single tenant. in some embodiments, each managed forwarding element implements multiple distributed routers belonging to multiple tenants.

ESGs 115A-X are connected to external network 150 and provide virtual machines or other data compute nodes connected to data center fabric 130 access to external network 150 by performing routing services. ESGs provide routing services and, in some embodiments, a number of stateful (e.g., firewall, NAT, etc.) or stateless services (e.g., access control lists (ACLs)). In different embodiments, ESGs 115A-X may be implemented as virtual machines (sometimes referred to as Edge VMs), in other types of data compute nodes (e.g., namespaces, physical hosts, etc.), or by using the Linux-based datapath development kit (DPDK) packet processing software (e.g., as a VRF in the DPDK-based datapath).

Edge service gateways in some embodiments terminate tunnels (e.g., tunnels defined by a network manager). In some embodiments, some edge service gateways make use of a VTEP of a host machine on which they execute while others implement their own VTEP when the edge node executes in a dedicated server (not shown). In some embodiments, edge service gateways run on bare metal (e.g., directly on a server or host), while in others, edge service gateways run as virtual machines on top of a hypervisor. Edge service gateways in some embodiments advertise the availability of the anycast inner IP address and anycast VTEP IP address at the hypervisor VTEP IP address to peers on an ESG uplink. One of ordinary skill in the art will understand that a network may include a number of edge service gateways operating in any combination of the above modes.

Control VM 125 in some embodiments peers with all ESGs to learn routes from all ESGs with the ESG anycast overlay IP as a next-hop. Control VM in some embodiments passes the learned routes through netcpa to central control plane (CCP) 160 for CCP 160 to distribute the routes to all distributed routers on all hypervisors.

Physical forwarding elements 140A and 140B, in some embodiments, are part of data center fabric 130 (e.g., leaf switches in a leaf-spine topology) and provide the VMs (e.g., ESGs 115A-X, control VM 125, and VMs 120) executing on hypervisors 105A-N and 105X access to the data center fabric 130 and, through edge service gateways 115A-X, to external network 150. Physical forwarding elements in some embodiments may be implemented as physical top of rack switches. In some embodiments, the networking elements making up the data center fabric run internal gateway protocols (IGPs) (e.g., open shortest path first (OSPF), routing information protocol (RIP), intermediate system to intermediate system (IS-IS), etc.) to direct packets along a shortest path to a packet destination.

Central control plane 160 in some embodiments configures ESGs to use a same anycast inner IP address and a same anycast inner MAC address and in some embodiments also configures the ESGs to advertise the anycast inner IP and anycast VTEP IP address to peers as reachable at the hypervisor connected VTEP IP address. CCP 160 also configures managed forwarding elements implementing distributed router 110 to use the anycast inner IP address as the default gateway for the distributed router and associate the anycast inner IP with the anycast inner MAC which will further be associated with the anycast VTEP IP address used by the physical machines hosting ESGs. CCP 160 in some embodiments also programs managed forwarding elements to implement a logical switch (e.g., a virtual distributed logical switch, logical switching element, etc.) to use the anycast inner addresses for the ESGs, and to use an equal cost multi-pathing (ECMP) strategy to distribute data messages to all ESGs on the same host as the managed forwarding element.

One of ordinary skill in the art would understand that the underlying network structure may be implemented in any number of ways that are consistent with the spirit of the invention. The particular network structure should not be construed as limiting the invention but is used solely for illustrative purposes.

Figure 2:
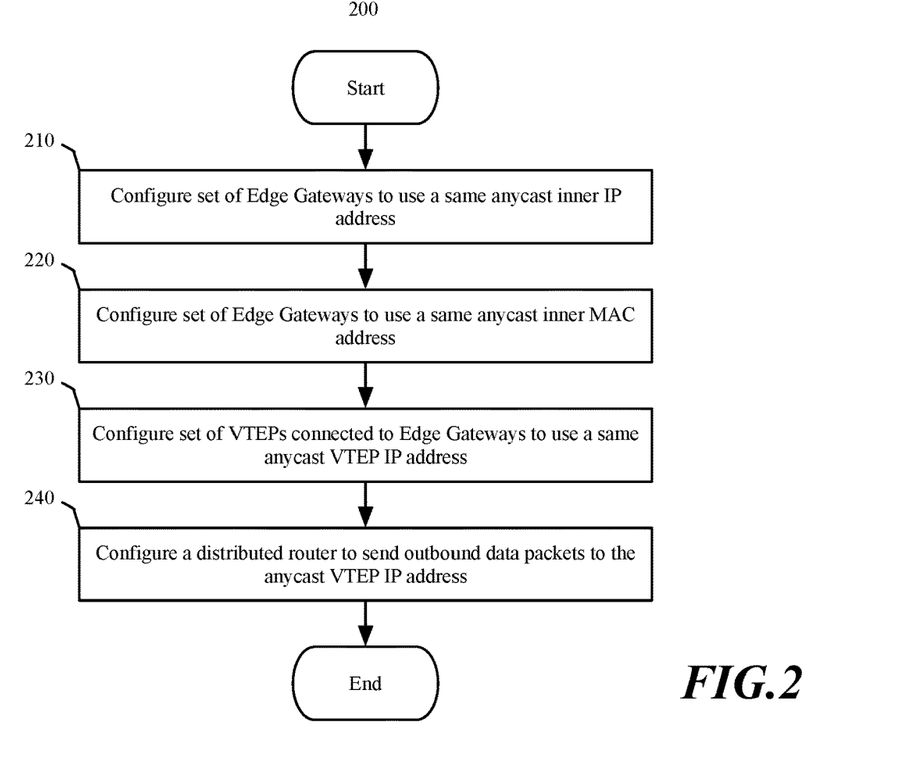
FIG. 2 conceptually illustrates a process of some embodiments for configuring edge service gateways to implement the invention.

FIG. 2 conceptually illustrates a process of some embodiments for configuring edge service gateways to implement the invention. In some embodiments of the invention process 200 is implemented by a central controller or central controller cluster that manages forwarding elements on different hosts to implement logical networks and distributed routers. The controller performs this process in some embodiments upon initial setup of a single ESG or group of ESGs. In some embodiments, this process is carried out in response to changes in an ESG group membership. It is to be understood that the steps of the process are independent and may be performed out of order.

As shown, process 200 begins when a controller configures (at 210) a set of edge service gateways to use a same anycast inner IP address. The anycast inner IP address is found in the inner packet header that is encapsulated according to a tunneling protocol (e.g., GRE, VXLAN, etc.). The process 200 then configures (at 220) the set of edge service gateways to use a same anycast inner MAC address. In some embodiments, the anycast inner IP address and the anycast inner MAC address are associated with each other in a DR.

Process 200 continues by configuring (at 230) a set of VTEPs connected to the set of ESGs to use a same anycast VTEP IP address. In some embodiments, as part of configuring the set of VTEPs to use a same anycast VTEP IP address, the process configures the anycast VTEP IP address to be associated with the anycast inner MAC address of the ESG group. One of ordinary skill in the art will appreciate that a VTEP IP address is just one example of an outer IP address that may be used in a tunneling protocol and that other outer IP addresses would function in similar manners.

It is to be understood that the steps 210-230 may be performed in any order and that the separate steps are not dependent on one another.

After configuring the ESGs and VTEPs with the anycast addresses, the process configures (at 240) a distributed router (DR) to direct outbound data packets to the anycast VTEP IP address. In some embodiments, configuring the DR includes providing the anycast inner IP address of the ESGs, the anycast inner MAC address of the ESGs, and the anycast VTEP IP address associated with the ESG group. The DR in some embodiments uses the anycast inner IP address as a default gateway that is associated with the anycast inner MAC address which in turn is associated with the anycast VTEP IP address. In such a configuration, a packet being sent to the default gateway is identified as being associated with the anycast inner MAC address and the anycast inner MAC address is identified as being associated with the anycast VTEP IP address such that the packet is sent (e.g., tunneled) to the anycast VTEP IP address. This configuration is in contrast to existing DR implementations that use a set of ESG unicast IP addresses as default gateways and perform load balancing (e.g., equal cost multi-pathing (ECMP)) to determine which ESG to direct the packet to without regard for the network topology or which ESG is "closest" according to an IGP. As noted above the DR also implements logical networks including logical switches (e.g., logical switch 1 in FIG. 1) connecting machines belonging to the logical network.

Figure 3:
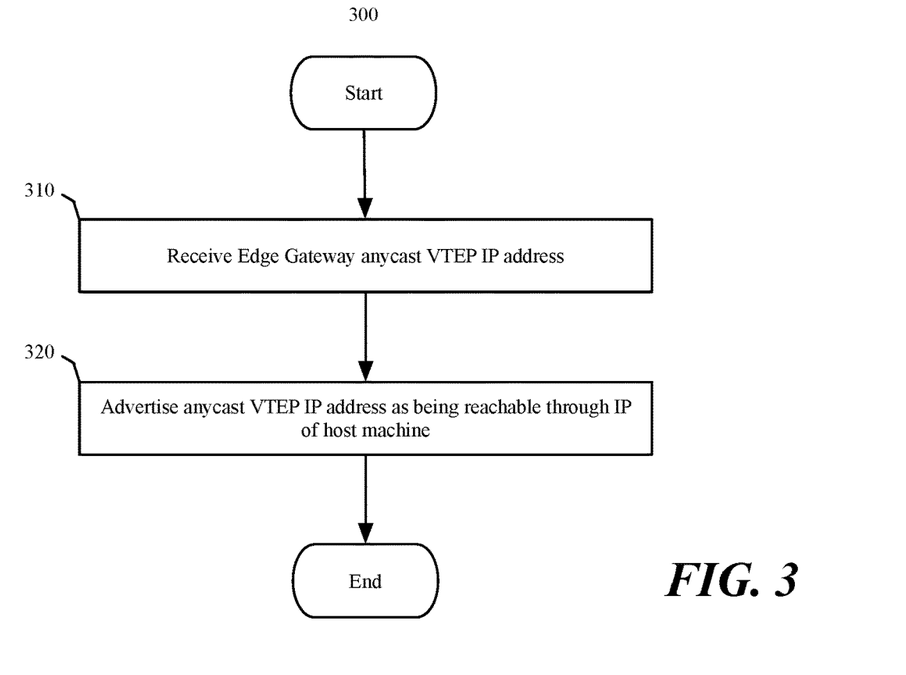
FIG. 3 conceptually illustrates a process of some embodiments for advertising the availability of edge service gateways to implement the invention.

FIG. 3 conceptually illustrates a process 300 that implements the novel method of some embodiments of the invention. The process 300 in some embodiments is implemented by a physical forwarding element that provides a connection to the rest of the network for a host machine hosting an ESG in the ESG group using the anycast inner IP and MAC addresses. The process receives (at 310) the anycast VTEP IP address from the host machine hosting the ESG. In some embodiments, an ESG executing on the host machine will be responsible for advertising to the physical forwarding element that the anycast VTEP IP address is reachable through a hypervisor connected VTEP IP address. The process then advertises (at 320) that the anycast VTEP IP address is reachable at the IP address of the host machine from which it received the anycast VTEP IP address. The process 300 then ends.

One of ordinary skill in the art would understand that the physical forwarding element will continue to advertise the availability of the anycast VTEP IP address as long as one ESG is executing on a host connected to the physical forwarding element. Additionally, if all ESGs previously connected to a physical forwarding engine fail, are migrated to hosts not connected to the physical forwarding element, or are deprovisioned, the physical forwarding element will advertise that the VTEP IP address is no longer available via the physical forwarding element.

Figure 4:
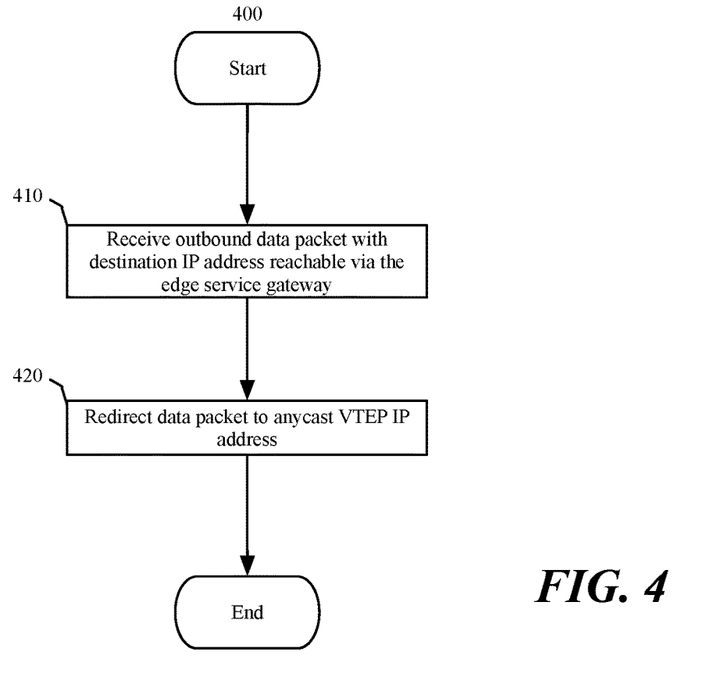
FIG. 4 conceptually illustrates a process of some embodiments for a distributed router to forward packets according to an implementation of the invention.

FIG. 4 conceptually illustrates a process 400 that implements the novel method of some embodiments of the invention. A distributed router implements the process 400 in some embodiments. The process receives (at 410) a packet that is bound for an IP address that is reachable via the group of edge service gateways.

Process 400 continues by directing (at 420) the packet to the anycast VTEP IP address. In some embodiments, the default gateway address of the DR is set to the anycast inner IP address of the ESG group. The anycast inner IP address is associated with the anycast inner MAC address which is further associated with the anycast VTEP IP address. A packet for which the default gateway is used is directed to the anycast VTEP IP address. The process then ends.

Figure 5:
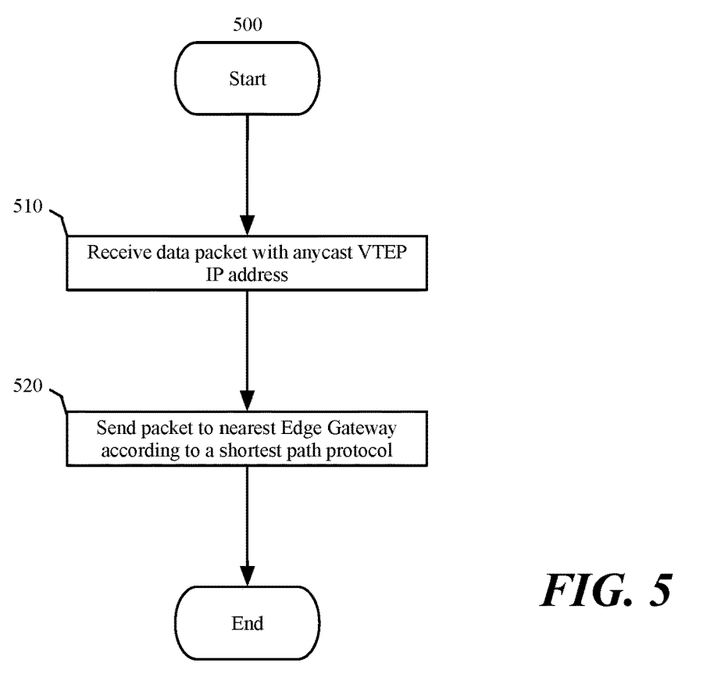
FIG. 5 conceptually illustrates a process of some embodiments for a physical forwarding element to forward packets according to an implementation of the invention.

FIG. 5 conceptually illustrates a process that implements the novel method of some embodiments of the invention. In some embodiments, a physical forwarding element (e.g., a top of rack switch) implements the process 500. The process receives (at 510) a packet addressed to the anycast VTEP IP address.

The process 500 sends the packet (at 520) to a closest edge service gateway that is closest according to a routing control protocol (e.g., a border gateway protocol (BGP); or an interior gateway protocol (IGP), such as open shortest path first (OSPF), routing information protocol (RIP), intermediate system to intermediate system (IS-IS), etc.). When multiple ESGs are closest according to the routing control protocol, in some embodiments, a load-balancing operation (e.g., equal-cost multi-path routing) is used to distribute data packets among the multiple closest ESGs.

Figure 6:
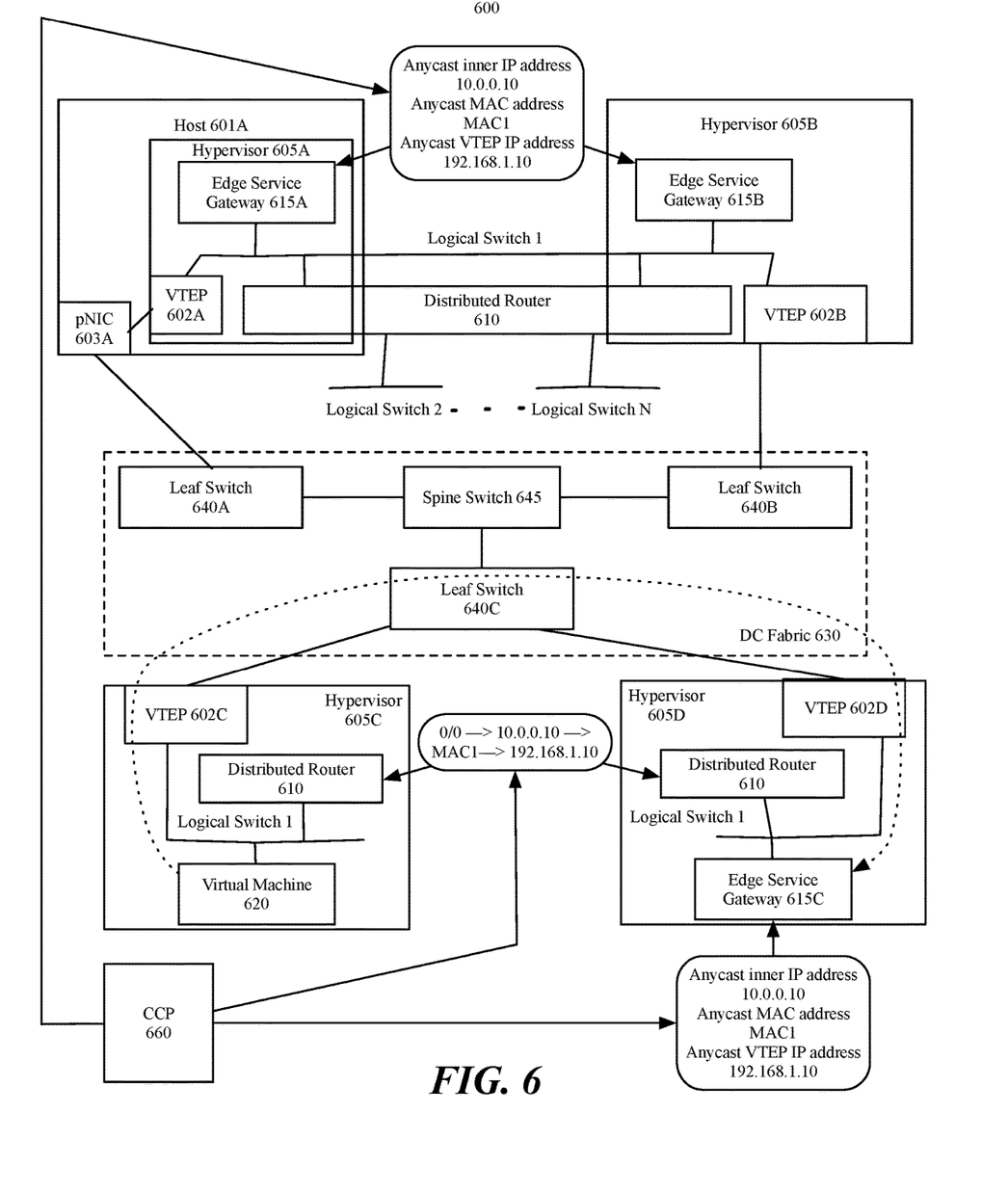
FIG. 6 illustrates a set of edge service gateways using a same set of anycast addresses in a system configured as in FIG. 1.

FIG. 6 illustrates an example architecture implementing the method of FIGS. 2-5. FIG. 6 illustrates a set of ESGs 615A-C executing on hypervisors 605A, B, and D. Hypervisor 605A is shown executing on host 601A with physical network interface controller (pNIC) 603A connecting to the VTEP 602A of hypervisor 605A. Other host machines and pNICs have been omitted for clarity.

FIG. 6 also illustrates a distributed router (DR) 610 that spans hypervisors 605A-D (e.g., is implemented by managed switching elements on hypervisors 605A-D). Hypervisor 605C also runs virtual machine 620 and terminates a tunnel at VTEP 602C. FIG. 6 also shows central control plane 660 configuring a default gateway for DR 610 on hypervisors 605C and D (CCP also configures DR 610 on hypervisors 605A and B, but that has been omitted for clarity). In FIG. 6 CCP is shown also configuring ESGs 615A-C to use the anycast inner IP, MAC, and VTEP (outer) IP address. The DR, in some embodiments, spans managed forwarding elements (MFEs) that couple directly to VMs or other data compute nodes that are logically connected, directly or indirectly, to the logical router. Distributed router 610 connects to a plurality of logical switches (e.g., logical switches 1-N). Logical switches 2-N may be connected to VMs executing on any number of host machines including edge service gateways. The DR is responsible for first-hop distributed routing between logical switches and/or other logical routers that are logically connected to the logical router.

FIG. 6 also illustrates a DC fabric implemented as a simple leaf-spine network topology with leaf switches 640A-C and spine switch 645. One of ordinary skill in the art would understand that the illustrated network topology could be modified in any number of ways to provide connectivity to machines in the network. FIG. 6 illustrates an embodiment in which hypervisor 605C running VM 620 connects to the same leaf switch as hypervisor 605D hosting edge service gateway 615C. For such an embodiment, a packet leaving VM 620 indicated by the dotted line exiting VM 620 is routed by the distributed router 610 over logical switch 1 to VTEP 602C for encapsulation. After encapsulation with the anycast VTEP IP address the packet continues to leaf switch 640C. Leaf switch 640C identifies VTEP 602D as the closest destination with the anycast VTEP IP address. In some embodiments, leaf switch 640C delivers the packet to hypervisor 605D because it is directly connected to leaf switch 640C while other ESGs are connected through spine switch 645 and either leaf switch 640A or leaf switch 640B. VTEP 602D decapsulates the packet and delivers the packet to ESG 615C. In some embodiments the packet is delivered through the distributed router.

Figure 7:
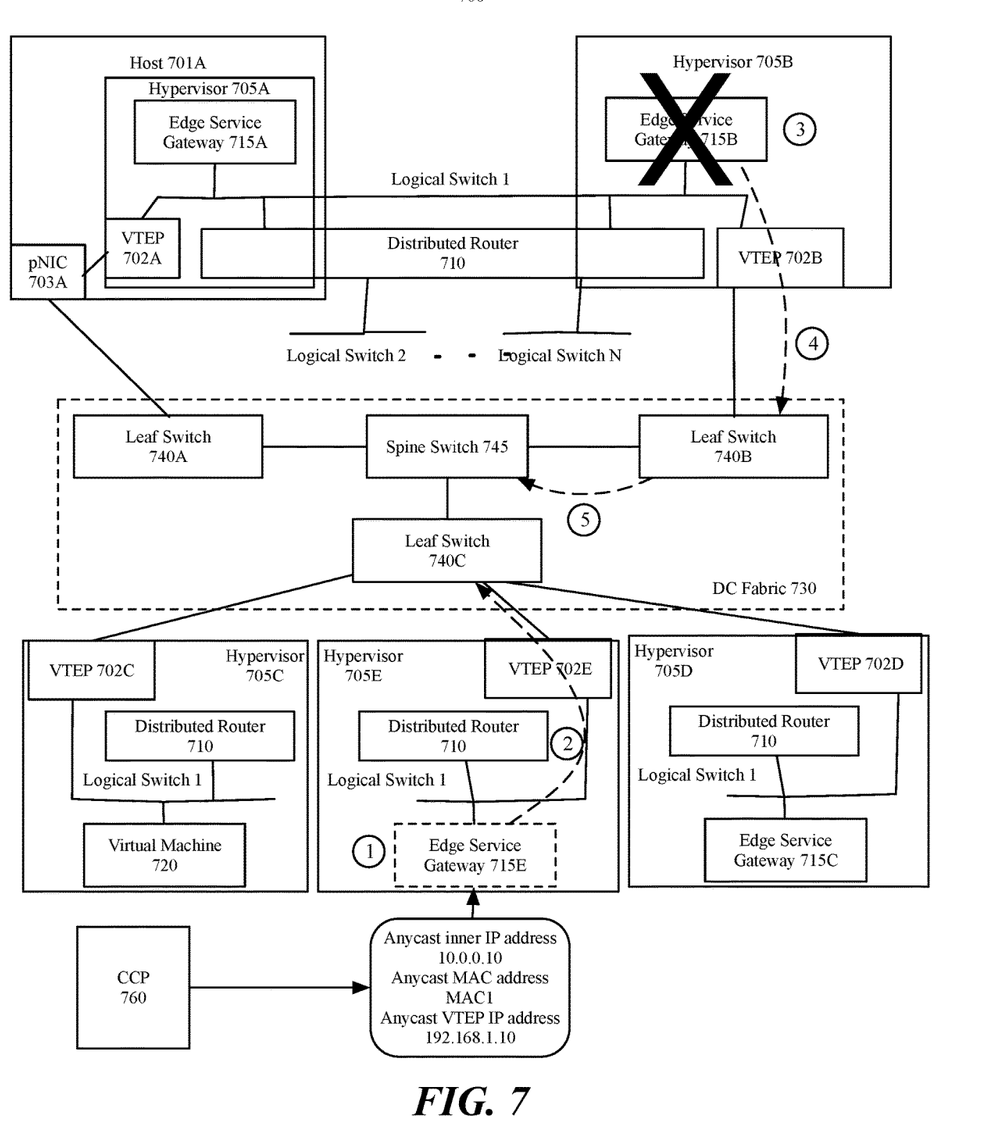
FIG. 7 illustrates a system in which some embodiments of the invention are implemented upon the addition or removal of edge service gateways.

FIG. 7 illustrates a system in which some embodiments of the invention are implemented upon the addition or removal of edge service gateways. In some embodiments, an edge service gateway is added as in operation '1'. An administrator controls the addition of ESG in some embodiments (e.g., manually or by establishing rules or policies governing ESG instantiation, for example a rule that instructs a network controller to provision a new ESG when ESGs are operating above a threshold percent of their capacity). As part of provisioning a new ESG, CCP 760 configures the new ESG to use the ESG group anycast inner IP address, anycast inner address, and anycast VTEP IP address. However, because the ESG shares a set of anycast addresses with the ESG group, CCP 760 does not need to reconfigure the DRs to include an IP address of the newly provisioned ESG as a default gateway address.

Operation '2' of FIG. 7 illustrates the newly provisioned ESG informing leaf switch 740C that the anycast VTEP IP address is now available at the VTEP 702E on hypervisor 705E. In some embodiments, operation '2' corresponds to step 410 in which leaf switch 240 receives the edge gateway anycast VTEP IP address. After receiving the information from ESG 715E, the leaf switch in some embodiments advertises the availability of the anycast VTEP IP address. In some embodiments, leaf switch 740C advertises the availability with a new metric reflecting the availability of an additional ESG via the leaf switch 740C. In other embodiments, leaf switch 740C does not re-advertise the availability of the anycast VTEP IP address because it had previously advertised the availability based on the connection to ESG 715C.

Operations '3' through '5' of FIG. 7 illustrate the removal (or failure) of an edge service gateway. Operation '3' indicate the removal or failure of ESG 715B. In some embodiments an administrator (e.g., manually, or by creating rules or setting policies) removes an ESG from a particular hypervisor (or host) as part of a migration to a new host, or because the ESG group is operating below a threshold percent of their capacity. Operation '4' indicates that the leaf switch is informed that ESG 715B is no longer running on the hypervisor 705B. In some embodiments the information comes from the hypervisor, while in others the leaf switch detects failure or removal through a fault-detection protocol (e.g., a bidirectional forwarding detections session established between the ESG and the leaf switch).

Operation '5' in some embodiments reflects the leaf switch informing other switches in the network that the anycast VTEP IP address is no longer available via leaf switch 740B if no other ESG connect to the network through leaf switch 740B. In other embodiments in which leaf switch 740B is connected to other ESGs, operation '5' does not take place or contains information regarding the number of available ESGs or their capacity. Such information enables other switches to perform load-balancing operations (e.g., ECMP) for multiple next hop switches with equal administrative costs using a weight or distribution calculation that takes onto account the number or capacity of ESGs connected to the next-hop switches.

Figure 8:
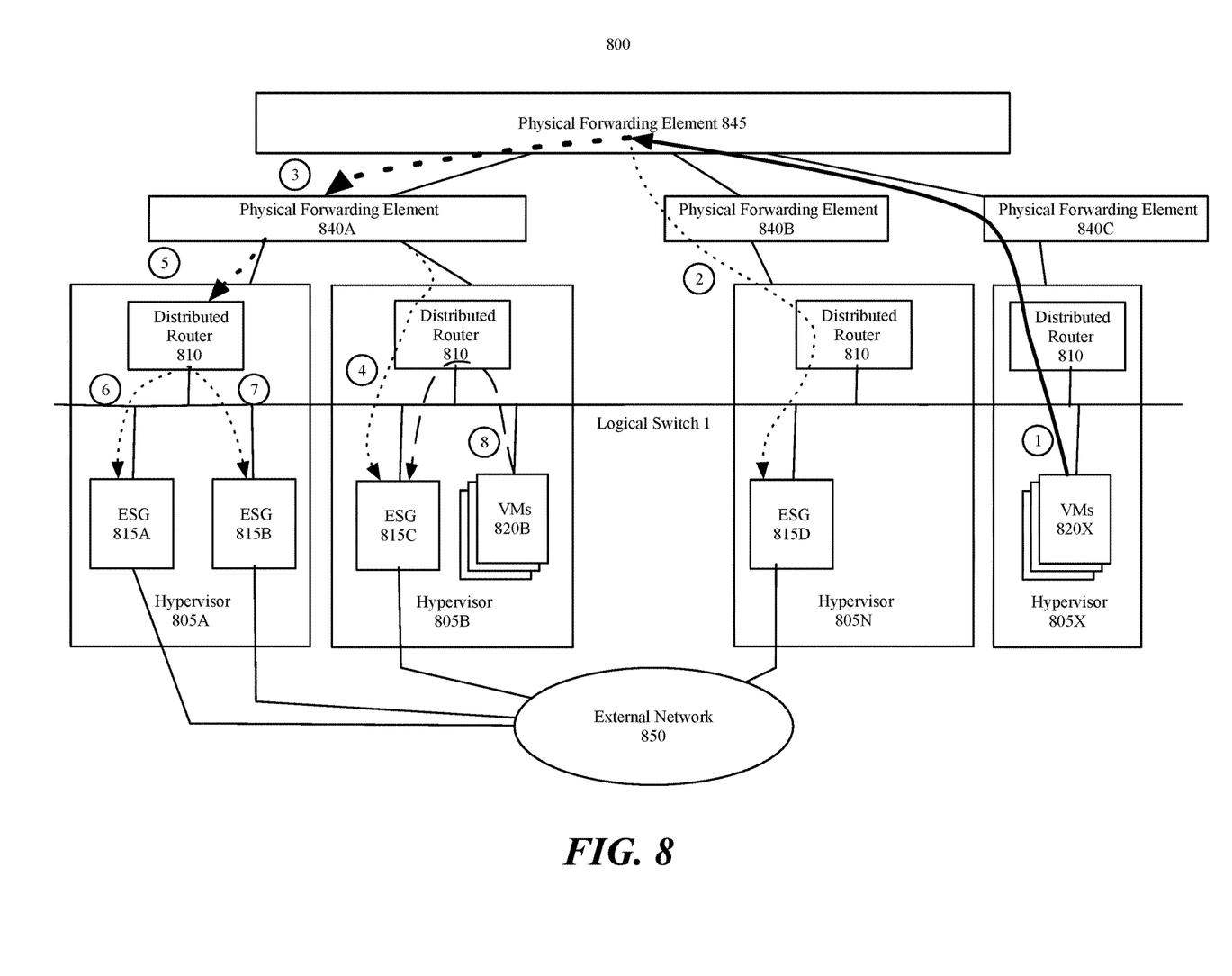
FIG. 8 illustrates anycast packet forwarding to edge service gateways in a system in which some embodiments of the invention are implemented FIG. 9 conceptually illustrates an electronic system with which some embodiments of the invention are implemented.

FIG. 8 illustrates anycast packet forwarding in a system in which some embodiments of the invention are implemented. FIG. 8 illustrates a number of ESGs 815A-D and VMs 820B and 820X executing on hypervisors 805A-X. Host machines on which hypervisors 805A-X execute along with physical NICs, VTEPs, and other elements described above have been left out for simplicity and clarity, but one ordinary skill in the art would understand the necessary elements to be included in the system of FIG. 8. FIG. 8 also illustrates a simple data center fabric including a physical forwarding element 845 that connects three physical forwarding elements 840A-C which further connect to hypervisors 805A-X.

The path labeled "1" in FIG. 8 represents a data packet sent from any of VMs 820X that is bound for a destination reachable via an ESG. All data packets forwarded to an ESG will be processed by distributed router 810 and forwarded to physical forwarding element 840C which will in turn forward the packet to physical forwarding element 845 which is the only connection to ESGs for VMs 820X. Physical forwarding element 845 in some embodiments runs an IGP that recognizes physical forwarding elements 840A and 840B as being a next hop for the VTEP IP address (e.g., through a forwarding table that stores the anycast VTEP IP address as available via the physical forwarding elements that have advertised the availability of the anycast VTEP IP address). In some embodiments, the administrative costs of physical forwarding elements will be the same as depicted in FIG. 8. In some embodiments, when multiple paths to a same anycast destination address have the same cost, a load balancing protocol (e.g., a hashing function, equal cost multi-pathing, etc.) divides the packets or data flows among the different destinations.

As shown in FIG. 8, from physical forwarding element 845 some packets are forwarded to physical forwarding element 840A (path "3") while others are forwarded to physical forwarding element 840B (path "2"). In some embodiments, more weight is given to physical forwarding element 840A because three ESGs are accessible via physical forwarding element 840A while only one ESG is accessible via physical forwarding element 840B. In some embodiments, the load balancing protocol gives more weight to a particular physical forwarding element based on the total capacity of the ESGs connected to the physical forwarding element as opposed to the number of ESGs (e.g., one ESG that is provisioned to handle twice as much traffic as another ESG being assigned a weight that is twice (or some other multiple) as great as the other ESG). As shown, path "2" goes directly from physical forwarding element 840B to ESG 815D via distributed router 810 because there is no other ESG accessible via physical forwarding element 840B.

In some embodiments, physical forwarding elements at each level of the network perform load balancing. Physical forwarding element 840A in FIG. 8 performs load balancing to divide the flows between hypervisors 805A (path "5") and 805B (path "4"). Similarly to physical forwarding element 845, physical forwarding element 840A assigns a greater weight to the hypervisor 805A because it executes two ESGs while hypervisor 805B only executes a single ESG. As shown, path "4" goes directly from physical forwarding element 840A to ESG 815C via distributed router 810 because there is no other ESG accessible via hypervisor 805B.

Distributed router 810 in some embodiments also performs load balancing when multiple ESGs execute on a same hypervisor. Along path "5", distributed router 810 performs load balancing to divide the flows between ESG 815A and ESG 815B. In some embodiments, the load balancing protocol assigns weights to the ESGs 815A and 815B based on different factors (e.g., capacity, percent of capacity in use, etc.) to use to perform a load balancing operation. The load balancing operation results in packets being forwarded to ESG 815A (path "6") or 815 B (path "7").

In some embodiments, ESG 815C executes on the same hypervisor as a set of VMs 820B. In such an embodiment a packet sent from a VM in the set of VMs 820B would follow path "8" which goes directly from the distributed router to ESG 815C and does not reach physical forwarding element 840A connected to the hypervisor. The above description of possible paths for packets demonstrates one of the benefits of assigning all ESGs in a logical network a single anycast inner IP, inner MAC and VTEP IP address to use. Specifically, as shown above for a system in which ESGs are spread over multiple hypervisors connected to multiple physical forwarding elements a packet takes a shortest path to reach an ESG avoiding sending packets over higher level forwarding elements in a hierarchical network structure unnecessarily. For example, in FIG. 8 path "8" avoids all physical forwarding elements, in FIG. 6 the path from VM 620 to ESG 615C avoids spine switch 645, and in FIG. 8 paths 1-7 avoid any physical forwarding elements that are higher in a hierarchy than physical forwarding element 845. This is in contrast to previous systems in which a distributed router maintained a list of ESG IP addresses as default gateways for which it would perform load balancing without regard for the "closeness" (e.g., as measured by administrative cost or other parameter) of the ESG to the source machine.

Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
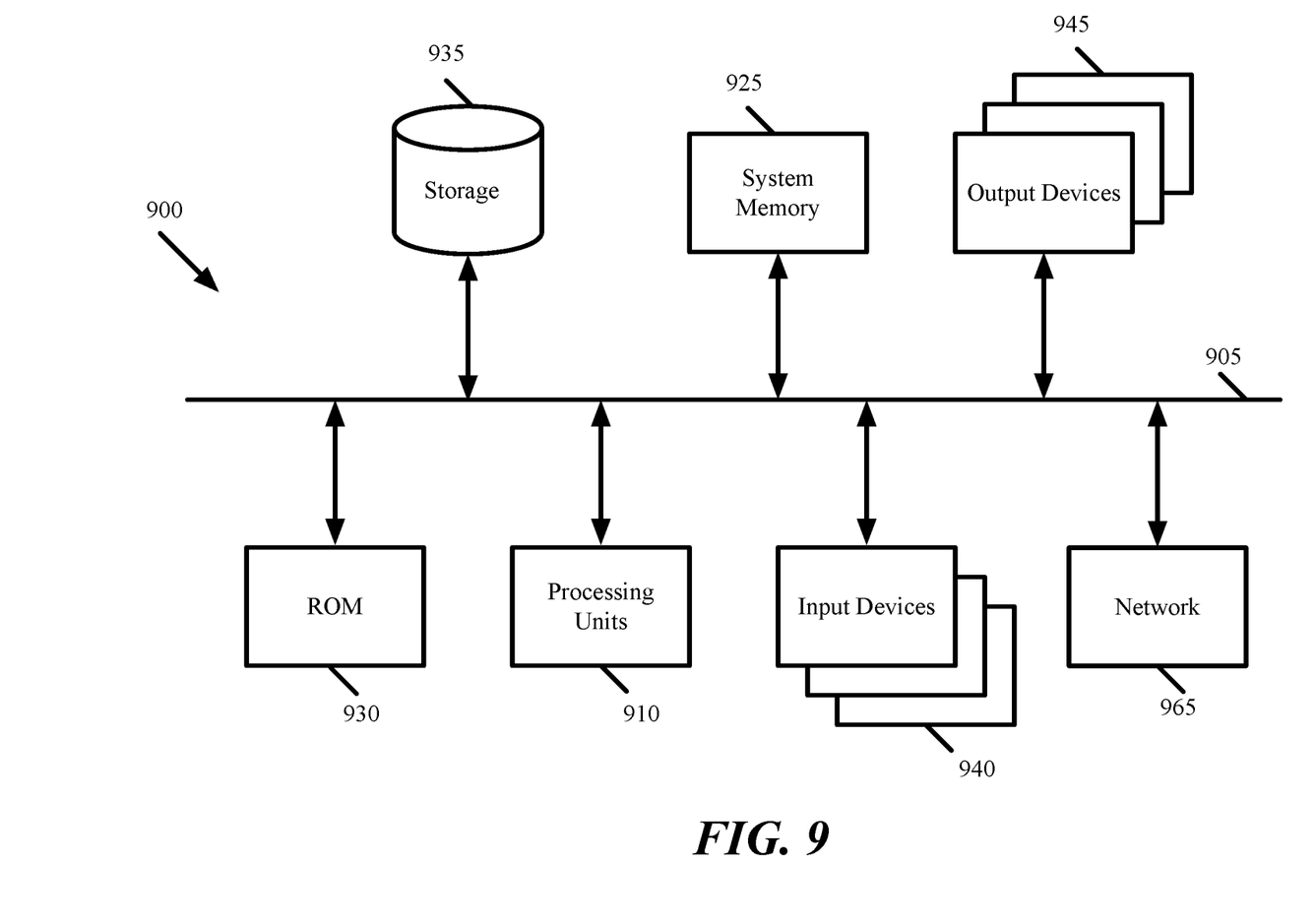

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2-5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for managing network traffic on a first host computer, the method comprising:

receiving a configuration for a particular edge gateway executing on the first host computer to use a same anycast overlay internet protocol (IP) address and a same anycast media access control (MAC) address as a set of other edge gateways that are part of a plurality of edge gateways with the particular edge gateway, the plurality of edge gateways for facilitating communication between data compute nodes of a logical network implemented in a datacenter and destinations on an external network; and receiving a configuration of a particular virtual extensible local area network tunnel end point (VTEP) executing on the host computer to use a same anycast VTEP IP address as a set of other VTEPs that are part of a plurality of VTEPs with the particular VTEP, each VTEP in the plurality of VTEPs connected to at least one of the edge gateways in the plurality of edge gateways, wherein each VTEP in the set of VTEPs advertises the availability of the anycast VTEP IP address to a set of datacenter forwarding elements connecting the VTEP to an underlay network of the datacenter;

wherein a plurality of host computers are configured to implement a distributed router of the logical network by sending data packets with destinations outside the logical network to the set of datacenter forwarding elements by using the anycast VTEP IP address; and wherein when a particular one of the datacenter forwarding elements receives a particular data packet with the anycast VTEP IP address from one of the host computers of the plurality of host computers, the particular forwarding element selects the particular VTEP and forwards the particular data packet to the particular VTEP for the particular edge gateway to process the particular data packet and forward the particular data packet to the external network.

2. The method of claim 1, wherein a default gateway of the distributed router is associated with the anycast VTEP IP address.

3. The method of claim 1, wherein the particular VTEP advertises the availability of the anycast VTEP IP address to a datacenter forwarding element that connects the particular VTEP to the underlay network.

4. The method of claim 1, wherein the particular forwarding element executes a dynamic routing protocol to perform a best route calculation that selects the particular VTEP for the particular data packet.

5. The method of claim 4, wherein, when multiple VTEPs of the plurality of VTEPs are equally close according to the best route calculation, the particular forwarding element performs a load balancing operation to select the particular VTEP from the plurality of VTEPs that are closest.

6. The method of claim 4, wherein the particular forwarding element performs the best route calculation according to internal gateway protocol (IGP).

7. The method of claim 1, wherein at least two of the edge gateways execute on the particular host computer, wherein the distributed router implemented on the particular host computer performs a load balancing operation for the at least two edge gateways that operate on the particular host computer.

8. A system for managing network traffic, the system comprising:

a first plurality of host computers that each execute (i) an edge gateway for facilitating communications between data compute nodes of a logical network implemented in a datacenter and (ii) a virtual extensible local area network tunnel endpoint (VTEP);

a plurality of datacenter forwarding elements that connect the VTEPs to an underlay network of the datacenter, wherein the edge gateways are each configured to use a same anycast overlay internet protocol (IP) address and a same anycast media access control (MAC) address, wherein the VTEPs are each (i) configured to use a same anycast VTEP IP address, connected to at least one edge gateway in the plurality of edge gateways, wherein each VTEP advertises the availability of the anycast VTEP IP address to a set of the datacenter forwarding elements connecting the VTEP to an underlay network of the datacenter; and a second plurality of host computers that implement a distributed router of the logical network to send data packets with destinations outside the logical network to the set of datacenter forwarding elements by using the anycast VTEP IP address, wherein when a particular datacenter forwarding element receives a data packet with the anycast VTEP IP address from one of the host computers, the particular datacenter forwarding element selects one of the VTEPs and forwards the data packet to the selected VTEP for the edge gateway on the same host computer as the selected VTEP to process the data packet and forward the data packet to the external network.

9. The system of claim 8, wherein a default gateway of the distributed router is associated with the anycast VTEP IP address.

10. The system of claim 8, wherein the particular forwarding element executes a dynamic routing protocol to perform a best route calculation that selects the particular VTEP for the particular data packet.

11. The system of claim 10, wherein, when a plurality of VTEPs are equally close according to the best route calculation, the particular datacenter forwarding element performs a load balancing operation to select the VTEP from the plurality of VTEPs that are closest.

12. The system of claim 10, wherein the particular datacenter forwarding element performs the best route calculation according to internal gateway protocol (IGP).

13. The system of claim 8, wherein two edge gateways execute on a particular host computer of the first plurality of host computers, wherein the distributed router is implemented on the particular host computer and is configured to perform a load balancing operation for the two edge gateways that operate on the particular host computer.

14. A non-transitory machine readable medium storing a program for managing network traffic on a first host computer, the program comprising sets of instructions for:
   receiving a configuration for a particular edge gateway executing on the first host computer to use a same anycast overlay internet protocol (IP) address and a same anycast media access control (MAC) address as a set of other edge gateways that are part of a plurality of edge gateways with the particular edge gateway, the plurality of edge gateways for facilitating communication between data compute nodes of a logical network implemented in a datacenter and destinations on an external network; and
   receiving a configuration of a particular virtual extensible local area network tunnel end point (VTEP) executing on the host computer to use a same anycast VTEP IP address as a set of other VTEPs that are part of a plurality of VTEPs with the particular VTEP, each VTEP in the plurality of VTEPs connected to at least one of the edge gateways in the plurality of edge gateways, wherein each VTEP in the set of VTEPs advertises the availability of the anycast VTEP IP address to a set of datacenter forwarding elements connecting the VTEP to an underlay network of the datacenter;
   wherein a plurality of host computers are configured to implement a distributed router of the logical network by sending data packets with destinations outside the logical network to the set of datacenter forwarding elements by using the anycast VTEP IP address; and
   wherein when a particular one of the datacenter forwarding elements receives a particular data packet with the anycast VTEP IP address from one of the host computers of the plurality of host computers, the particular forwarding element selects the particular VTEP and forwards the particular data packet to the particular VTEP for the particular edge gateway to process the particular data packet and forward the particular data packet to the external network.

15. The non-transitory machine readable medium of claim 14, wherein a default gateway of the distributed router is associated with the anycast VTEP IP address.

16. The non-transitory machine readable medium of claim 14, wherein the particular VTEP advertises the availability of the anycast VTEP IP address to a datacenter forwarding element that connects the particular VTEP to the underlay network.

17. The non-transitory machine readable medium of claim 14, wherein the particular forwarding element executes a dynamic routing protocol to perform a best route calculation that selects the particular VTEP for the particular data packet.

18. The non-transitory machine readable medium of claim 17, wherein, when multiple VTEPs of the plurality of VTEPs are equally close according to the best route calculation, the particular forwarding element performs a load balancing operation to select the particular VTEP from the plurality of VTEPs that are closest.

19. The non-transitory machine readable medium of claim 17, wherein the particular forwarding element performs the best route calculation according to internal gateway protocol (IGP).

20. The non-transitory machine readable medium of claim 14, wherein at least two of the edge gateways execute on the particular host computer, wherein the distributed router implemented on the particular host computer performs a load balancing operation for the at least two edge gateways that operate on the particular host computer.

\* \* \* \* \*